United States Patent [19]

Hutton et al.

[11] Patent Number: 4,650,947
[45] Date of Patent: Mar. 17, 1987

[54] INDUCTION TACKING METHOD AND APPARATUS

[76] Inventors: Roger L. Hutton, 3141 Pikewood Ct., Milford, Mich. 48042; John P. Williams, Jr., 10475 Moon Lakes Ct., Pinckney, Mich. 48169

[21] Appl. No.: 702,498

[22] Filed: Feb. 19, 1985

[51] Int. Cl.$^4$ ............................................. H05B 6/10
[52] U.S. Cl. ............................ 219/10.41; 219/10.53; 219/10.73; 156/273.3; 156/274.2; 156/380.2
[58] Field of Search ............... 219/10.53, 10.57, 10.67, 219/10.69, 10.71, 10.73, 10.75, 10.79, 9.5, 10.41, 10.43, 85 A; 156/272.2, 273.3, 273.5, 273.7, 273.9, 274.2, 275.1, 275.3, 379.6, 379.7, 379.8, 379.9, 380.2, 380.4

[56] References Cited

U.S. PATENT DOCUMENTS

| | | | |
|---|---|---|---|
| 3,460,310 | 8/1969 | Adcock et al. | 219/10.53 X |
| 3,467,806 | 9/1969 | Dixon | 219/10.73 |
| 3,580,780 | 5/1971 | Klawunn et al. | 219/10.53 X |
| 3,798,403 | 3/1974 | Mitchell et al. | 219/10.53 |
| 4,501,943 | 2/1985 | Lund | 219/10.43 |

Primary Examiner—Philip H. Leung
Attorney, Agent, or Firm—Barnes, Kisselle, Raisch, Choate, Whittemore & Hulbert

[57] ABSTRACT

Securing a ribbon of an expandable resin containing a heat activated blowing agent to a metal body, such as a sheet metal bow for the roof of a vehicle body, by bonding a portion of the ribbon to the body. The portion of the metal body immediately adjacent the ribbon is induction heated to transfer sufficient heat to the ribbon to bond it to the metal body without heating the bulk of the ribbon sufficiently to activate the blowing agent to expand the bulk of the ribbon into a foam resin. Subsequently, the metal body with the ribbon secured thereto is assembled with a panel and then heated to activate the blowing agent to produce a resin foam disposed between the metal body and panel.

29 Claims, 10 Drawing Figures

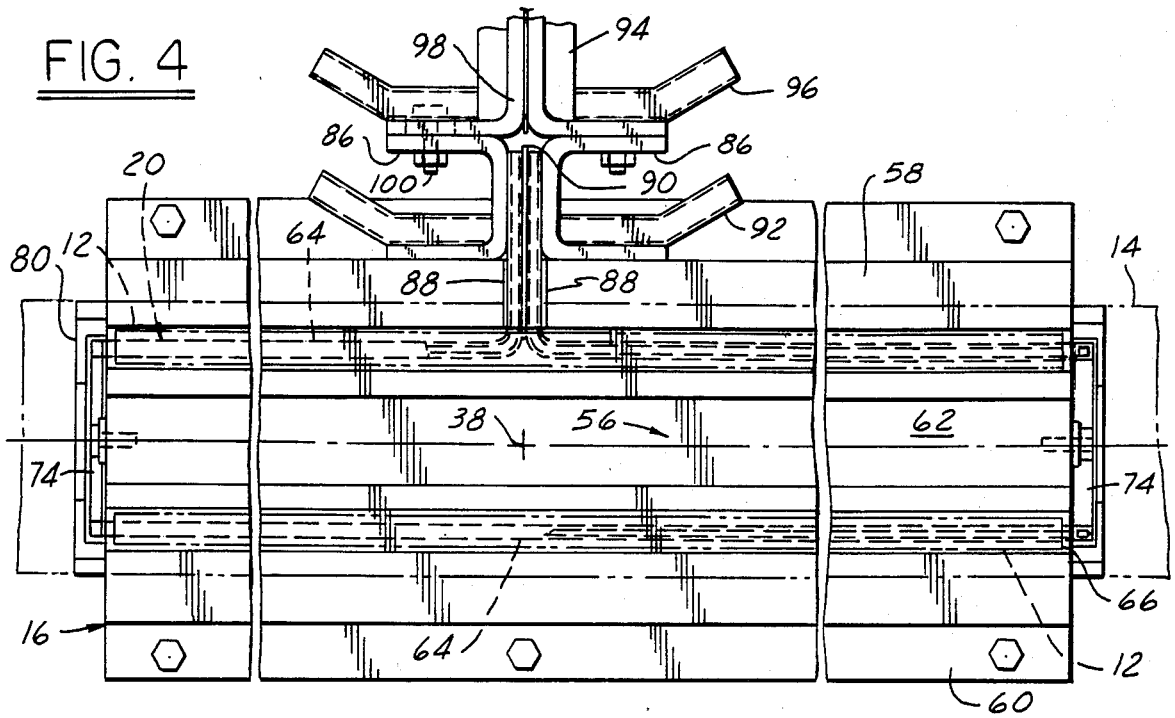
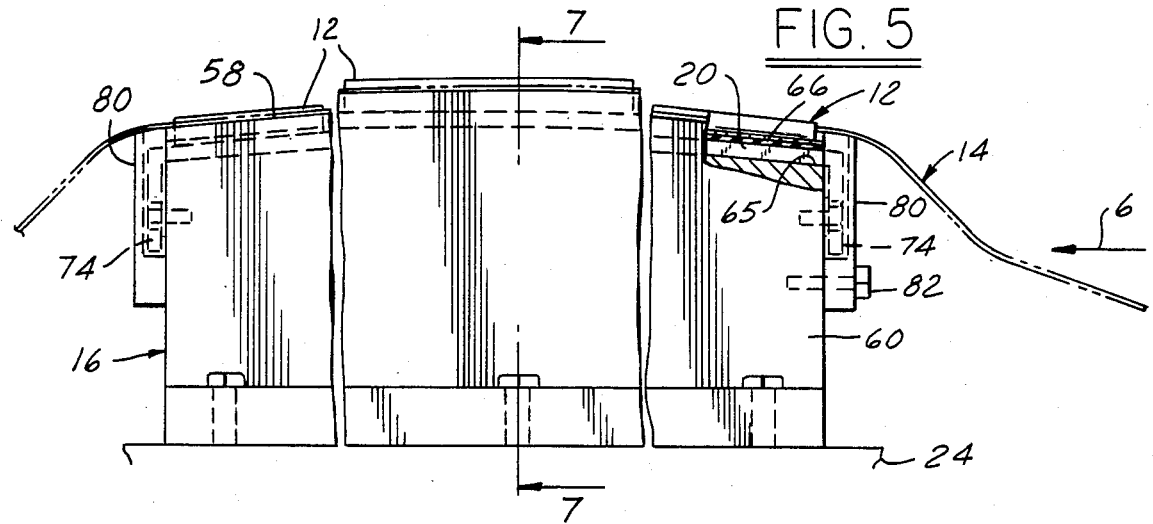
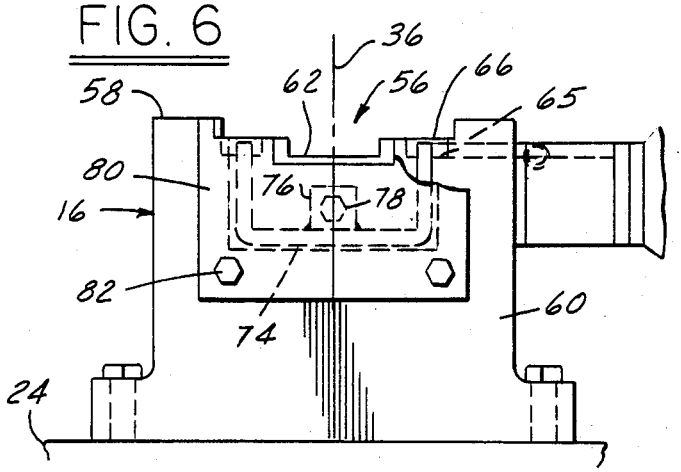

INDUCTION TACKING METHOD AND APPARATUS

FIELD OF THE INVENTION

This invention relates to a foam resin and sheet metal assembly and more particularly to staking, tacking or fastening a ribbon of an expandable plastic resin containing a heat activated blowing agent to a piece of sheet metal without activating the blowing agent in the bulk of the resin.

BACKGROUND OF THE INVENTION

Many products have foam resin disposed between a pair of pieces of sheet metal for a variety of purposes, such as providing a flexible connection between the pieces, supporting one of the pieces, preventing the transmission of noise between the pieces, preventing the pieces from striking each other, filling the space between the pieces, electrically and thermal insulating the pieces, and the like.

For example, in manufacturing the bodies of vehicles such as trucks, cars, and buses, a foam resin is disposed between a sheet metal roof panel and an underlying sheet metal bow or support for the roof panel. When making the body, an elongate ribbon of an expandable resin containing a heat activated blowing agent has been fastened by staples to a roof bow of sheet metal. Subsequently, the sub-assembly of the resin and bow is assembled in the body so that it underlies and is spaced from the roof panel. Thereafter, the body passes through an oven, such as a paint-baking oven, which heats the ribbon of resin sufficiently to activate the blowing agent which causes the resin to foam and expand so that it bears on the underside of the roof panel and fills the space between the bow and the panel. This supports the roof panel without the bow bearing directly on the panel and hence prevents transmission of noise and the bow and panel from striking each other.

However, in practice, the staples produce a non-uniform expansion of the resin foam which distorts or warps the roof panel and frequently, even causes an impression of the central portion of the staple to be clearly visible in an exterior surface of the painted roof panel. Attempts to manufacture this assembly without fastening the ribbon of resin to the bow before it is expanded also have been largely unsuccessful. It is difficult to handle and sub-assemble with the roof panel the bow and ribbon of resin as separate pieces when the ribbon is unsecured. Moreover, when unsecured, portions of the ribbon tend to shift or move with respect to the bow so that it is not located where desired when heated to activate the blowing agent and when heated expands unevenly which results in distortion of the roof panel and sometimes spots where there is inadequate foam resin to isolate the panel from the bow which results in highly undesirable noise or rattles when the vehicle is in use.

SUMMARY OF THE INVENTION

In accordance with this invention, a ribbon of an expandable resin containing a heat activated blowing agent is bonded to a metal body such as a piece of sheet metal by heating only a portion of the resin immediately adjacent the sheet metal sufficiently to cause bonding without heating the bulk of the resin sufficiently to activate the blowing agent. The resin is heated by induction heating the portion of the sheet metal contacted by the resin. The metal is heated by an alternating current applied to an induction coil which lies adjacent to but spaced from the metal and extends generally along the area of contact between the sheet metal and the portion of the ribbon of resin which is to be bonded. The metal is rapidly induction heated by applying alternating current to the coil for a short period of time, preferably not more than about ten seconds, and of a relatively high power or energy level to heat only the portion of the sheet metal at which bonding occurs to a temperature of at least 200° F. and yet at a power or energy level which is low enough to avoid heating the bulk of the resin sufficiently to activate the blowing agent. After cooling the ribbon of resin is firmly bonded to the sheet metal. Preferably, the ribbon of resin is bonded to the sheet metal substantially throughout its length. Preferably, to improve bonding, the ribbon of resin is urged into firm engagement with the sheet metal at least while the alternating current is applied to the induction coil, and preferably for at least two seconds thereafter while the sheet metal and resin at least partially cools.

Preferably, the ribbon of resin is urged into engagement with the sheet metal by a substantially uniform force throughout the area to be bonded. Usually, the piece of sheet metal provides a sufficient heat sink and radiating surface area so that the heated portion of the resin and sheet metal cool very rapidly.

This bonding may be performed by an apparatus with a fixture member to locate and support the piece of sheet metal, a moveable head member to urge the ribbon of resin into firm engagement with the sheet metal and an induction coil carried by one of the members. The members are mounted in generally opposed relation on the platens of a press. Preferably, one of the platens is self-aligning with respect to the other platen so that the head will urge the ribbon of resin into engagement with the sheet metal with a substantially uniform force throughout the portion of ribbon to be bonded to the sheet metal.

Objects, features and advantages of this invention are to provide a method and apparatus for fastening to sheet metal a ribbon of resin containing a heat activated blowing agent, which eliminates distortion of an associated panel when the blowing agent is activated and the resin cured to produce a foam resin disposed between the sheet metal and the panel, eliminates any fasteners or separate adhesives attaching the ribbon to the sheet metal, produces a more uniform foam resin when the blowing agent is activated, secures the ribbon to the sheet metal throughout the length of the ribbon, and is very rapid, simple, reliable, dependable, easy to use, does not require highly skilled labor, and is highly suitable for mass production operations.

DESCRIPTION OF THE DRAWINGS

These and other objects, features and advantages of this invention will be apparent from the following detailed description, appended claims and accompanying drawings in which:

FIG. 4 is a top view of a fixture of the apparatus taken generally on line 4—4 of FIG. 2;

FIG. 5 is an enlarged side view of the fixture;

FIG. 6 is an enlarged end view of the fixture;

DETAILED DESCRIPTION

Figure 1:
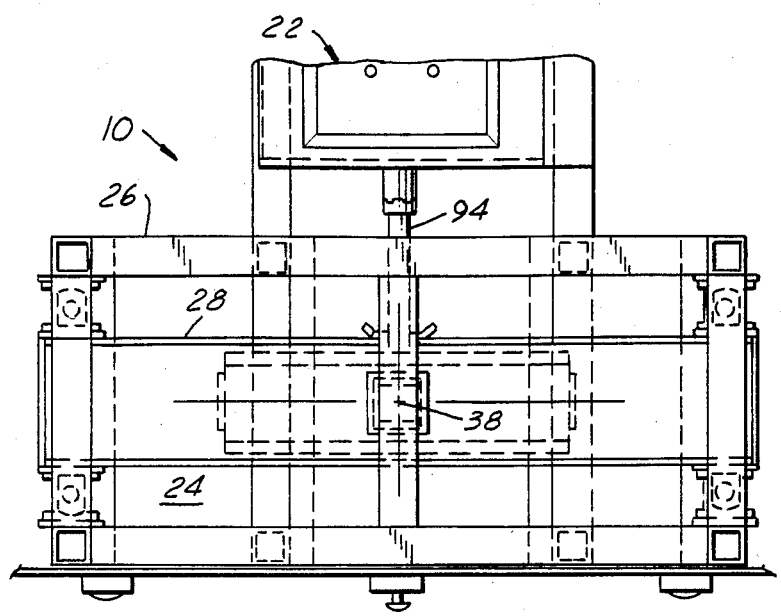
FIG. 1 is a fragmentary top view of an apparatus for carrying out this invention.
Figure 2:
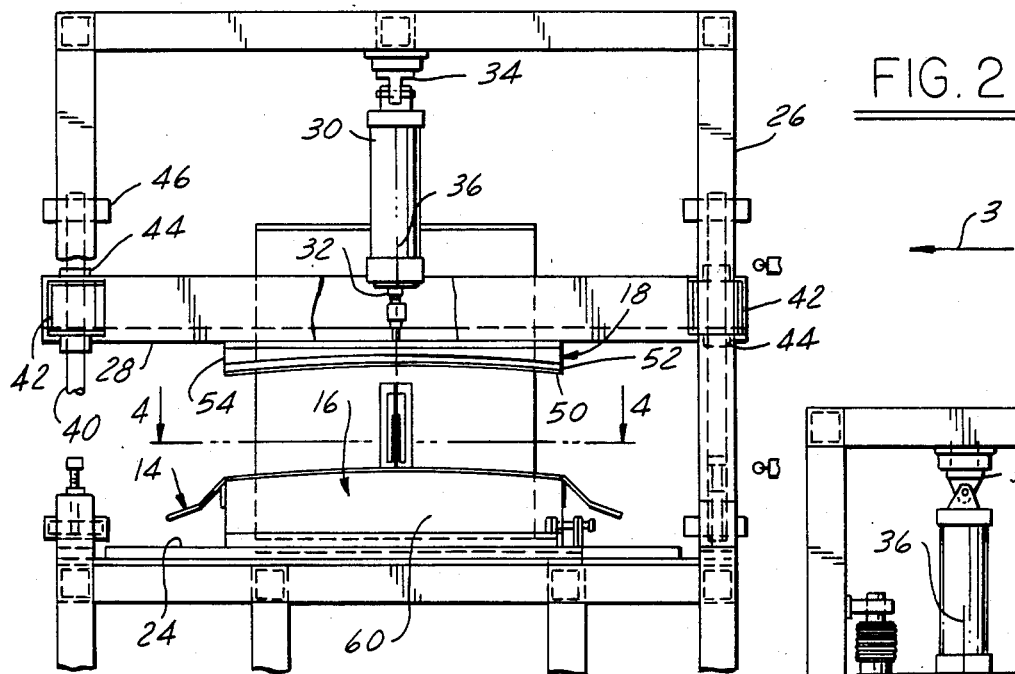
FIG. 2 is a fragmentary side view of a portion broken away of the apparatus of FIG. 1.
Figure 3:
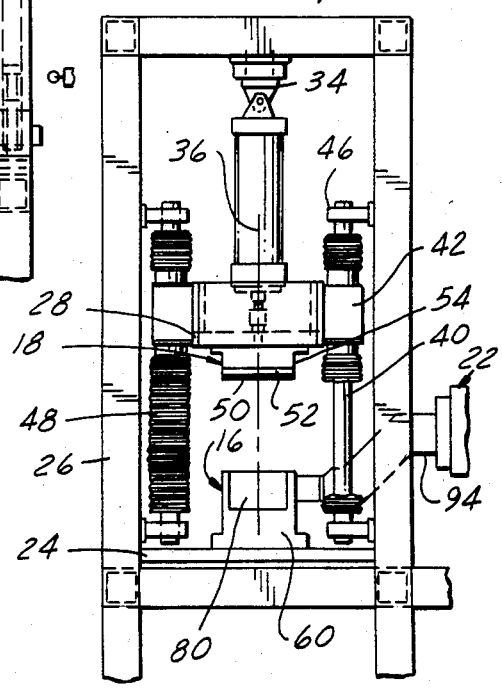
FIG. 3 is a fragmentary end view of the apparatus of FIG. 1.

Referring in more detail to the drawings, FIGS. 1 through 3 illustrate an apparatus 10 for carrying out the process of this invention to bond two ribbons 12 (FIG. 8) of an expandable resin containing a heat activated blowing agent to a sheet metal bow 14 or support for a roof panel of a vehicle body. The bow is received in a locating and supporting fixture 16 and the ribbons 12 of resin are urged into engagement with the bow by a generally opposed head 18. To induction heat portions of the bow underlying the ribbons of resin, an alternating current is supplied to an induction coil 20 in the fixture by a power supply 22.

The fixture is mounted on a lower platen 24 secured to a frame 26 of the apparatus and the head is carried by a movable upper platen 28. The upper platen is advanced and retracted by a pneumatic cylinder 30 with its piston rod 32 connected to the platen and its body connected to the frame by a clevice and pin assembly 34.

In accordance with one feature of this invention, the ribbons of resin are urged into engagement with the bow by a substantially uniform force throughout the portion of the ribbon to be bonded. This is achieved by applying the force from the pneumatic cylinder 30 through a line of action 36 coincident with the middle or center 38 of the symmetrical fixture 16 and mounting the upper platen 28 and head so that they can shift or are self-aligning with respect to the fixture and lower platen. The upper platen is mounted on guide shafts 40 with self-aligning pillow blocks 42 and ball bushing assemblies 44. The self-aligning pillow blocks and bushing assemblies allow the platen to pivot or rock slightly in all directions to compensate for any errors in construction and alignment of the head and fixture and variations from one bow to another and one ribbon of resin to another. The guide shafts are mounted on the frame by support blocks 46 secured to the frame. To prevent contamination by dirt, dust, and the like, the guide shafts and bushing are closed by flexible boots 48. Suitable guide shafts, support blocks, ball bushings, and self-aligning pillow blocks are commercially available from Thomson Industries, Inc. of Manhasset, N.Y. 11030 as type B shaft support blocks, solid 60 shafts, and type SPB supper pillow blocks with ball bushings.

To further insure the ribbons of resin are urged into engagement with the bow by a substantially uniform force throughout their length, preferably the head 18 has a slightly flexible pad 50 for bearing on the ribbons which is received on a cushion 52 of foam rubber which is adhered to a base 54. The exposed face of the contact pad 50 has an arc or contour complementary to the underlying portion of the bow 14. The head should be made of materials which do not deteriorate in use when subjected to elevated temperatures of up to about 400° F. Preferably, the contact pad is of Teflon, the cushion of foam rubber, and the base of an epoxy resin, such as the epoxy resin sold under the trade name Haysite by the Haysite Reinforced Plastics Division of Zurn Industries Inc. of 5599 Newperry Highway, Erie, Pa. 16909.

In accordance with another feature of this invention, the bow 14 is accurately located with respect to the induction coil 20 by a cavity 56 in the upper face 58 of a base 60 of the fixture. The upper face 58 and the bottom 62 of the cavity are complementary to and support the bow. The longitudinal runs or legs 64 of the coil 20 are potted in grooves 65 in the bottom of the cavity with a material 66 such as RTV rubber, which electrically insulates the runs of the coil from the metal bow and operating personnel. The potting material 66 should be able to withstand without deterioration elevated temperatures of up to about 500° F. and the adjacent portion of the base 60 to withstand temperatures of up to about 400° F. The base 60 can be made of an epoxy resin such as that sold under the trade name Haysite.

Figure 9:
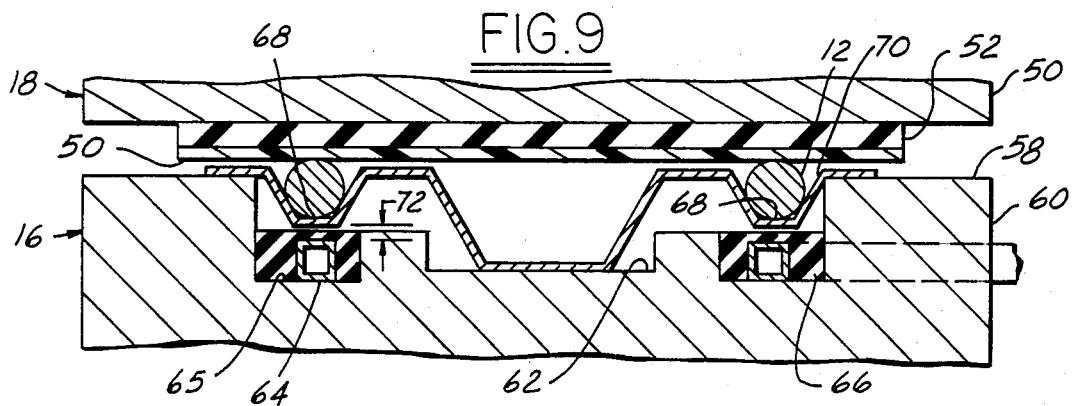
FIG. 9 is a fragmentary sectional view similar to FIG. 8 showing the fixture and a head which is advanced to urge the ribbons of resin into firm engagement with the sheet metal bow.

In accordance with another feature of this invention, the longitudinal runs of the coil are spaced and located to maximize their effectiveness and efficiency in heating only the portions of the sheet metal immediately adjacent the area of the ribbons to be tacked or bonded to the bow. This promotes the most efficient transfer of heat to the portions of the ribbons to be bonded. As shown in FIG. 9, for the bow 20 each ribbon of resin is most efficiently bonded in the area 68 at the base of trough 70 in the bow in which the ribbon is received. By bonding only in the areas 68; the amount of metal to be heated is minimized and the remainder of the bow provides a heat sink and large radiating area which rapidly cools the ribbons after the areas 68 have been raised to a bonding temperature.

The efficiency with which the metal portions are heated by the coil is primarily a function of the configuration and size in cross section of the coil, frequency of the current applied to the coil, and spacing between the coil and the metal portions. For a given coil configuration and size in cross section, the most efficient spacing varies with the frequency of the alternating current applied to the coil with the distance between the sheet metal and coil decreasing as the frequency of the current increases. For coils having a square cross section of about ¼ inch on a side, the spacing or distance 72 between the portion of the bow to be heated and the adjacent face of the coil is usually in the range of about 0.400 to 0.030 of an inch, typically about 0.250 to 0.040 of an inch, and preferably about 0.120 to 0.060 of an inch for a frequency of the alternating current applied to the coil in the range of about 5 KHz to 1,000 KHz. Typically, for this coil size and configuration and a current having a frequency of about 400 KHz to 600 KHz, the distance 72 is usually about 0.060 of an inch. Usually, it is desirable to empirically determine the exact distance 72 for a given cross sectional size and configuration of the coil, the portion of the bow to be heated, and the frequency and power of the alternating current applied to the coil.

When bonding a ribbon of resin to an area of a bow having a sharp bend, sometimes the coil cannot be spaced far enough away from this area, which usually results in this area of the sheet metal being heated to an excess temperature and burning of the resin and/or activation of the blowing agent, and burning and warping or distortion of the metal in the localized area. To prevent this excess heating, a small portion of the coil in this area can be shielded with a ferrite material or laminated steel plates which decreases the amount of energy radiated by the coil and hence eliminates the localized area of excessive heating. A suitable ferrite shielding material is sold under the trade name Ferrocon by Polymer Corporation of Reading, Pa. 19603.

To prevent the bow from being heated in the area where the coil crosses under the bow adjacent the ends of the fixture, the coil has two generally U-shaped loops 74 which depend sufficiently so that the bow is outside of and thus not heated by the field produced by these loops when current is applied to the coil. Preferably, the loops have a tab 76 secured to the fixture by a bolt 78 of a non-conductive material, such as epoxy. Preferably, the loops of the coil are enclosed by cover plates 80 of an electric insulating material such as epoxy resin secured to the ends of the fixture cap screws 82 preferably of a non-conductive material.

As shown in FIG. 4, electric connectors 86 are fixed to the ends 88 of the coil which are separated by a sheet 90 of an electric insulating material such as Teflon. When in use, the coil is cooled by circulating through it a coolant such as water fed through couplers 92 connected to the ends of the coil. The coil is connected to the power supply through similar water cooled conduits 94 separated by a sheet 95 of Teflon insulating material. These conduits have cooling water couplers 96 and electric connectors 98 secured to the connectors 86 by bolts 100.

The efficiency with which an induction coil heats sheet metal is also a function of the frequency of the alternating current applied to the coil. In general, the efficiency with which the metal is heated increases with increasing frequency of the current. For applications where very rapid heating is unnecessary, a current with a frequency of about 5,000 Hz can be used. For applications where more rapid heating is desirable or necessary, an alternating current with a radio frequency is desirable. Usually, this frequency is at least 50 KHz, desirably in the range of 100 KHz to 1,000 KHz, and preferably about 200 KHz to 700 KHz.

Figure 10:
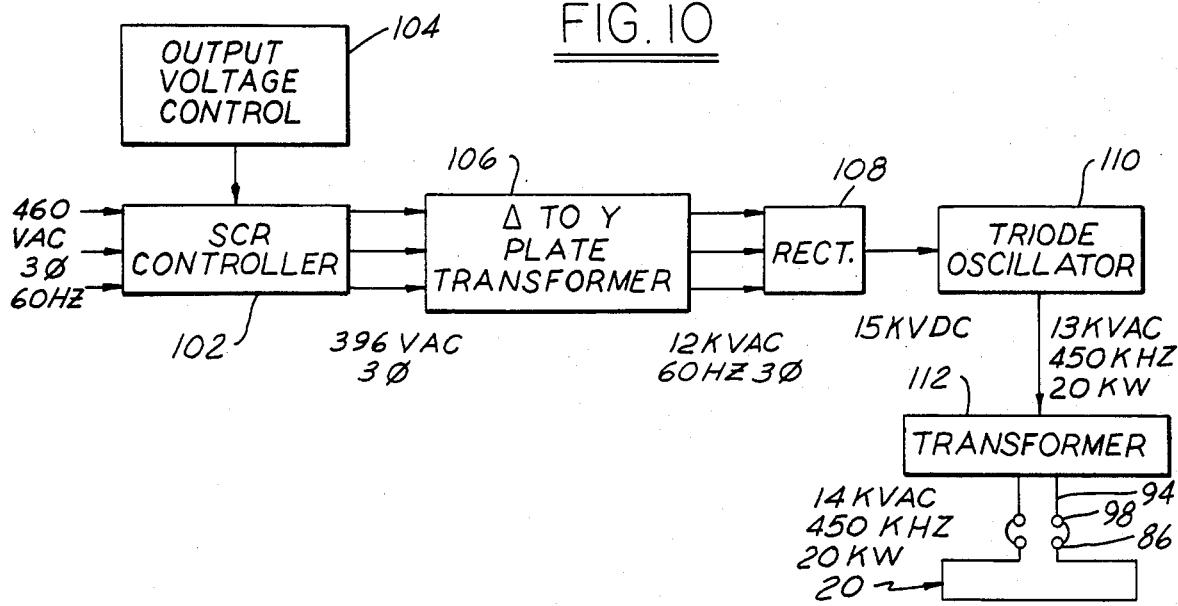
FIG. 10 is block diagram of a power supply for the induction coil of the apparatus.

The block diagram of a suitable power supply 22 is shown in FIG. 10 in which utility or plant electric power at 460 volts AC, 60 Hz and 3 phase, is fed to a water cooled SCR controller 102 through suitable circuit breakers, interrupters and filter capacitors (not shown). Preferably, this SCR controller is Model 418-042 controller and Model 359027-3 current limiter marketed by the Robicon Division of Barber Coleman Company of P.O. Box 360247, Pittsburgh, Pa. 25251. The controller 102 provides a regulated nominal output of 396 volts AC independent of voltage variation of up to plus or minus 10% in the three input phases. A manually variable control 104 adjusts or "fine tunes" the output of the controller and hence, the overall power supply 20.

The three phase output of the SCR controller 102 is fed to the primary windings of a delta-to-wye plate transformer 106 through surge suppressors (not shown). The secondary windings of the transformer 106 supply three-phase power at 12,000 volts AC and 60 Hz to a rectifier bank 108 which is a series of diodes. The output of the rectifier bank of 15,000 volts DC is fed to a water cooled triode oscillator 110 having a resonant tank circuit which includes a primary winding of a single phase transformer 112. The secondary winding of the transformer 112 is connected to the coil 20 through the conduits 94. Thus, the transformer 112 and the induction coil 20 form part of the oscillator tank circuit.

The triode of the oscillator has a grid electromagnetically connected to the tank circuit which causes the oscillator to resonate in tune with the tank circuit. The resonance turns the output of the triode on and off rapidly to produce a single phase alternating current having a high frequency in the range of about 50 Hz to about 500 Hz.

The turns ratio of the primary winding to the secondary winding of the transformer 112 is selected to match the load created by the induction coil and the sheet metal bow being heated by the coil. The turns ratio is usually in the range of about 13:1 to 13:6. For example, in one working embodiment of the power supply, the turns ratio of the transformer 112 is 9:1 so that the output of the oscillator of 13,000 volts AC, 450 KHz at 20 KW is stepped down by the transformer to 1,440 volts, 450 KHz and 20 KW which is applied to the induction coil to bond the ribbons of resin to the sheet metal bow. The alternating current is applied to the coil for a short period of time or cycle, which is usually less than six seconds.

The bonding apparatus also has several electric and electropneumatic circuits and components for cycling and operating the apparatus which have not been described because they are unnecessary for a complete understanding of this invention and how the apparatus works.

In use, apparatus 20 is connected to suitable sources of air under pressure, water under pressure, and plant utility electric power. The apparatus is set up to tack or adhere ribbons 12 of resin to the sheet metal bow 14 by aligning and securing the head 18 to the upper platen generally in opposed relation with the fixture 16 which is secured to the lower platen. The coil 20 of the fixture is electrically connected to the power supply 22 through the conductors 94.

Figure 7:
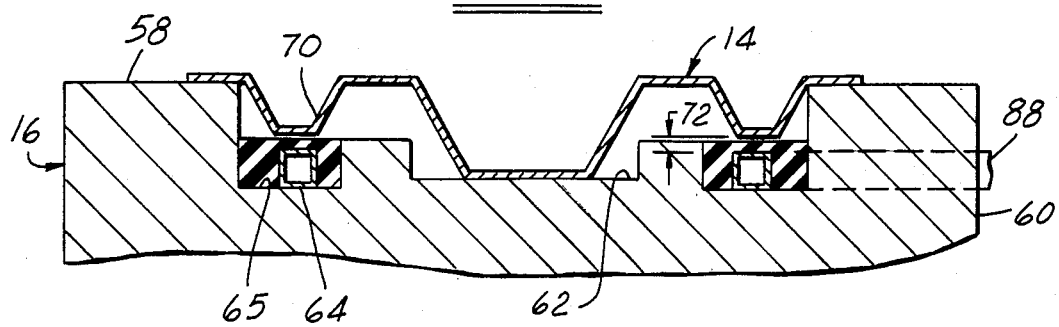
FIG. 7 is an enlarged fragmentary sectional view showing a sheet metal roof bow received in the fixture taken generally on line 7—7 of FIG. 5.
Figure 8:
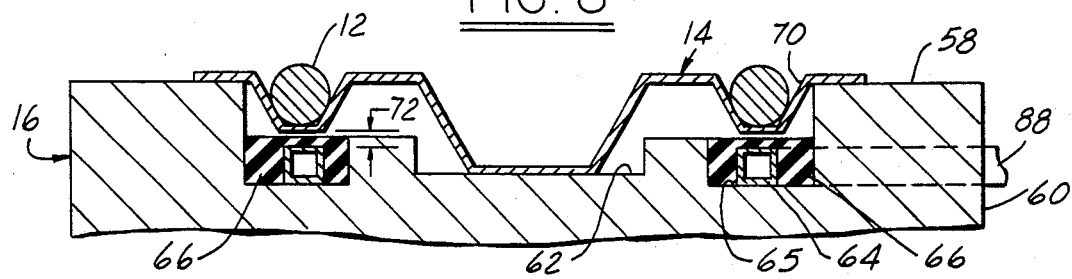
FIG. 8 is an enlarged sectional view similar to FIG. 7 showing the bow in the fixture with two ribbons of resin received on the bow.

In using apparatus 20 to carry out the method of this invention, with the head in the raised position as shown in FIG. 2, the bow 14 of sheet metal is inserted and located in the cavity 56 of the fixture 16, as shown in FIGS. 3 and 7. Preferably, a ribbon of resin 12 is then placed in each trough 70 of the bow as shown in FIGS. 4 and 8. Although, if desired, the ribbons of resin can be placed in the troughs before the bow is inserted in the open fixture.

After the bow and ribbons of resin are inserted, the cylinder 30 is energized through appropriate electropneumatic circuitry (not shown) to advance the head so that the pad 50 urges the ribbons of resin into firm engagement with the bottom of the troughs of the bow (as shown in FIG. 10) throughout the length of the portion of the ribbon to be bonded to the bow. A substantially uniform force is applied to the ribbons of resin substantially throughout the length of the portion to be bonded because the line of action 36 of the force produced by the cylinder is coincident with the center 38 of the plan of the areas to be bonded when the ribbons and bow are located in the fixture and any misalignment or out of squareness is compensated for by the foam rubber cushion 52 and the floating upper platen carrying the head. The platen is allowed to shift and float within predetermined limits by the self-alignining pillow blocks 42 and bushings 44.

Preferably, the force produced by the cylinder is adjusted such as by varying and controlling the pressure of the air supplied to the cylinder 30, so that the head urges the ribbons of resin into engagement with the bow with a force of about 16 to 80, desirably 24 and 64, and preferably about 40 pounds per square inch of surface area of the resin to be bonded to the bow. For a strand of resin having a circular cross section with a diameter of about ⅜ inch, this force is equal to about 2 to 10, desirably 3 to 8, preferably about 5 pounds per lineal inch of ribbon of resin.

While the head urges the ribbons of resin into engagement with the bow an alternating current produced by the power supply 22 is applied through appropriate electric control circuitry (not shown), to the induction coil 20 to heat portions of the metal bow to an elevated temperature. Portions of the bow underlying each ribbon are heated sufficiently to bond the resin in this area to the bow substantially throughout the length of the resin without heating the bulk of the ribbon sufficiently to activate the blowing agent. To insure bonding of the ribbon to the bow, preferably the heated resin is urged into engagement with the bow for a short period of time, preferably at least two seconds, after the current is turned off, while the heated resin and metal at least partially cools. Normally, they cool rapidly because the bow provides a heat sink and a large surface area for radiating energy.

The head is raised to disengage the ribbons of resin by energizing the cylinder 30 through appropriate electro-pneumatic circuitry. After the head is raised, the bow with the ribbons of resin tacked or bonded to it is removed from the fixture 16. Apparatus 10 is then ready to begin another cycle.

A portion of the ribbon of resin must be heated sufficiently to bond to the sheet metal without heating the bulk of the resin sufficiently to activate the heat activated blowing agent. In most resins containing heat activated blowing agents it is necessary to heat the surface of the resin contacting the metal for not more than about ten seconds to a temperature of at least 200° F., desirably at least 250° F. and preferably about 325° F. to 375° F., to produce bonding. If the temperature of the metal reaches about 400° F., it tends to become distorted and discolored when cooled and any die drawing compound or corrosion retarding oil on the sheet metal begins to decompose which further discolors the metal and destroys the effectiveness of the oil in preventing corrosion. When the bulk of the resin is heated for about 40 to 25 minutes to a temperature of about 275° to 350° F. the blowing agent is activated and the resin blown to an expanded foam. Suitable ribbons of resin with a heat activated blowing agent are commercially available from L & L Products, Inc., 74100 Van Dyke Rd., Romeo, Mich. under the trade designations L-2025 and L-4100. L-1025 is a synthetic rubber expandable sealant/adhesive and L-4100 is a copolymer expandable adhesive/sealant.

In most resin compositions with a heat activated blowing agent, a satisfactory bond is obtained without activating the blowing agent in the bulk of the resin and without distorting or discoloring the sheet metal, by applying to the coil a current for a short period of time at a relatively high power or energy level. This period of time is not more than ten seconds, usually not more than six seconds, and preferably about one to four seconds. This power or energy level of the current in watts per square inch of surface area of resin bonded to the metal, is usually in the range of about 1.5 to 4 KW, desirably 2.0 to 3.5 KW, and preferably 2.5 to 3.0 KW. For fastening or bonding a ribbon of resin having a circular cross section with a nominal diameter of about ⅜ inch, this is the equivalent in watts per lineal inch of ribbon of about 190 to 500, desirably 250 to 440, and preferably 210 to 380 watts per lineal inch.

After the ribbons of resin are bonded to the roof bow, the bow is assembled under the roof panel in a vehicle body. Subsequently, the expandable resin is heated to an elevated temperature to activate the blowing agent to produce an expanded or foam resin between the roof panel and bow. Usually the blowing agent is activated by passing the vehicle body through a paint baking oven at a temperature of about 300° F. for about 30 to 60 minutes or preferably at a temperature of about 350° F. for 20 to 45 minutes. This results in the resin being fully blown and cured to produce a resin foam disposed between the bow and the roof panel.

We claim:

1. A process of tacking a ribbon of an expandable resin containing a heat activated blowing agent in a predetermined position on a sheet metal body, comprising, contacting the ribbon of resin with the sheet metal body substantially throughout the length of at least the portion of the ribbon to be bonded to the sheet metal body, disposing an induction coil of an electrically conductive metal adjacent the sheet metal body so that it extends generally along and adjacent the portion of the ribbon to be bonded to the sheet metal body and spaced from the sheet metal body, applying to the coil an alternating current for a period of time of not more than ten seconds and of sufficient power to induction heat to a temperature of at least 200° F. only the portion of the sheet metal body immediately adjacent the portion of the ribbon to be bonded to the sheet metal body and to raise to a bonding temperature only the portion of the ribbon immediately adjacent the heated portion of the sheet metal body without raising the temperature of the bulk of the ribbon sufficiently to activate the heat activated blowing agent contained therein, whereby the ribbon of resin is bonded to the sheet metal body by heating a portion of the ribbon to a bonding temperature without activating the blowing agent in the bulk of the ribbon.

2. The process of claim 1 which also comprises, urging the ribbon of resin into firm engagement with the metal body at least substantially throughout the portion of the ribbon to be bonded to the metal body at least while the current is applied to the coil to heat the portion of the metal body.

3. The process of claim 1 which also comprises, urging at least substantially all of the portions of the ribbon of resin to be bonded to the metal body into engagement therewith at least while such alternating current is applied to the coil to heat the portion of the metal immediately adjacent the ribbon and thereafter while such heated portions of the metal body and ribbon at least partially cool to bond the ribbon to the metal body.

4. The process of claim 3 wherein the ribbon and metal body are urged together for at least about two seconds after the alternating current has been applied to the coil to heat portions of the metal body and ribbon.

5. The process of claim 3 wherein the ribbon is urged into engagement with the metal body with a substantially uniform force throughout the portion of the ribbon to be bonded to the metal body of about two to ten pounds per lineal inch of the portion of the ribbon to be bonded.

6. The process of claim 3 wherein the ribbon is urged into engagement with the metal body with a substantially uniform force throughout the portion of the ribbon to be bonded to the metal body of at least fifteen pounds per square inch of area of the portion of the surface of the ribbon to be bonded to the metal body.

7. The process of claim 3 wherein the ribbon of resin is urged into engagement with the metal body with a substantially uniform force throughout the portion of the ribbon to be bonded to the metal body of about fifteen to eighty pounds per square inch of area of the portion of the surface of the ribbon to be bonded to the metal body.

8. The process of claim 1 wherein application of such alternating current to the coil heats the portion of the metal body to a temperature of at least 250° F.

9. The process of claim 1 wherein the alternating current applied to the coil has a frequency of at least 5,000 Hz and a power of about 190 to 500 watts pe lineal inch of the portion of the ribbon to be bonded to the metal body.

10. The process of claim 1 wherein the alternating current applied to the coil has a frequency of at least about 5,000 Hz and a power of about 1,500 to 4,000 watts per square inch of the area of the portion of the surface of the ribbon bonded to the metal body.

11. The process of claim 1 wherein the face of the coil closest to the metal body is spaced from the surface of the metal body to which the ribbon is bonded by about 0.03 to 0.40 of an inch.

12. The process of claim 1 which also comprises a head member and a fixture member arranged in generally opposed relation to be moved toward and away from each other in generally closed and opened relationship, said fixture member being constructed and arranged to receive and locate said metal body, said head member being constructed and arranged to urge the portion to be bonded of the ribbon into engagement with the metal body when said members are closed, and said coil being carried by one of said members to position said coil with respect to said metal body and ribbon when said members are in closed relationship.

13. The process of claim 12 wherein said coil is received in said fixture member.

14. The process of claim 12 which also comprises a press having a pair of generally opposed platens each carrying one of said members, one of said platens being constructed and arranged such that when said members close said one platen can within predetermined limits shift its alignment with the other said platen such that said head applies a substantially uniform force to the ribbon substantially throughout the portion of the ribbon to be bonded to the metal body and said force being in the range of about 15 to 80 pounds per square inch of area of the surface of the ribbon bonded to the metal body.

15. The process of claim 12 wherein the current applied to said coil by said power supply heats the portion of the metal body to a temperature not greater than about 400° F.

16. The process of claim 12 which also comprises a ram constructed and arranged to move said head to said open and closed positions and when in said closed position applies to the portion of the ribbon to be bonded to the metal body a force of two to ten pounds per linear inch of ribbon to be bonded to the metal body.

17. The process of claim 12 which also comprises a ram constructed and arranged to move said head to said open 2nd closed positions and when in said closed position applies to the portion of the ribbon to be bonded to the metal body a force of fifteen to eighty pounds per square inch of area of the portion of the surface of the ribbon to be bonded to the metal body.

18. The process of claim 12 which also comprises a press having a pair of generally opposed platens movable toward and away from each other and each carrying one of said members, said press being constructed and arranged such that when said head urges the portion of the ribbon to be bonded into engagement with the metal body in the fixture one of said platens can shift within predetermined limits with respect to the other of said platens such that said head applies a substantially uniform force at least substantially throughout the portion of the ribbon to be bonded to the metal body at least while said power supply applies the alternating current to said coil.

19. The process of claim 18 wherein said press in constructed and arranged to urge the ribbon into engagement with the metal body for at least two seconds after the current is applied to said coil while the heated portion of the ribbon and metal body at least partially cools to bond the ribbon to the metal body.

20. The process of claim 12 wherein said coil and power supply are constructed and arranged so that they heat only the portion of the sheet metal immediately adjacent the portion of ribbon to be bonded to a temperature which is not greater than about 400° F.

21. The process of claim 1 which also comprises contacting the ribbon of resin with the metal body at least substantially continuously throughout the length of the resin, disposing the induction coil so that it extends along the metal body throughout the length of the ribbon with the face of the coil adjacent the metal body spaced from the portion of the metal body to be heated a distance in the range of about 0.03 to 0.40 of an inch, whereby when the current is applied to the coil the ribbon of resin is bonded to a surface of the metal body at least substantially continuously throughout the length of the ribbon without activating the blowing agent in the bulk of the ribbon.

22. The process of claim 21 wherein the portion of the metal body heated by the induction coil is heated to a temperature not greater than about 400° F.

23. The process of claim 1 wherein the portion of the metal body heated by applying a current to the induction coil is raised to a temperature not greater than about 400° F.

24. The process of claim 23 wherein the alternating current applied to the coil has a frequency of at least about 5,000 Hz and a power of about 1,500 to 4,000 watts per square inch of area of the surface of the portion of the ribbon bonded to the metal body.

25. The process of claim 1 which also comprises, subsequently heating the assembly of the ribbon of resin tacked to the metal body to a temperature of at least about 300° F. for at least about twenty minutes to activate the blowing agent in the resin and produce a foam resin.

26. A process of tacking a ribbon of an expandable resin containing a heat activated blowing agent in a predetermined position on a first piece of sheet metal and expanding the resin to bear on a second piece of sheet metal comprising, contacting the ribbon of resin with the first sheet metal piece substantially throughout the length of at least the portion of the ribbon to be bonded to the first sheet metal piece, disposing an induction coil of an electrically conductive metal adjacent the first sheet metal piece so that it extends generally along and adjacent the portion of the ribbon to be bonded to the first sheet metal piece and spaced from the first sheet metal piece, applying to the coil an alternating current for a period of time of not more than ten seconds and of sufficient power to induction heat to a temperature in the range of about 200° F. to 400° F. on the portion of only the first sheet metal piece immediately adjacent the portion of the ribbon to be bonded to the first sheet metal piece and to raise to a bonding temperature only the portion of the ribbon immediately adjacent the heated portion of the first sheet metal piece without raising the temperature of the bulk of the ribbon sufficiently to activate the heat activated blowing agent contained therein so that the ribbon of resin is bonded to the first sheet metal piece without activating the blowing agent in the bulk of the ribbon, disposing the second sheet metal piece adjacent the first sheet metal piece with the ribbon therebetween, and subsequently heating the assembly of the disposed second and first sheet metal pieces with ribbon of resin already tacked to the first sheet metal piece to a temperature of at least about 300° F. for at least about twenty minutes to activate the blowing agent in the resin and produce a foam resin between and bearing on both the first and second sheet metal pieces.

27. The process of claim 26 which also comprises, contacting the ribbon of resin with the metal body at least substantially continuously throughout the length of the resin, disposing the induction coil so that it extends along the metal body throughout the length of the ribbon with the face of the coil adjacent the metal body spaced from the portion of the metal body to be heated a distance in the range of about 0.03 to 0.40 of an inch, whereby when the current is applied to the coil the ribbon of resin is bonded to a surface of the metal body at least substantially continuously throughout the length of the ribbon without activating the blowing agent in the bulk of the resin.

28. The process of claim 26 wherein said power supply is constructed and arranged so that such alternating current has a frequency of at least about 50,000 Hz and a power of about 1,500 to 4,000 watts per square inch of the area of the portion of the surface of the ribbon bonded to the metal body.

29. An apparatus for tacking a ribbon of resin containing a heat activated blowing agent to a sheet metal body comprising, a press having a pair of generally opposed platens, a fixture member carried by one of said platens and constructed and arranged to receive and locate the sheet metal body, a head member carried by the other of said platens and movable relative to said fixture member to open and closed positions and constructed and arranged when in the closed position to urge at least the portion of the ribbon to be bonded to the sheet metal body into firm engagement with the sheet metal body, self aligning means connected to one of said platens and being constructed and arranged such that when said members close said one platen can within predetermined limits shift its alignment with the other said platen such that said head applies a substantially uniform force to the ribbon substantially throughout the portion of the ribbon to be bonded to the metal body, a ram constructed and arranged to move said head to said open and closed positions and when in said closed position applies to the portion of the ribbon to be bonded to the metal body a force of fifteen to eighty pounds per square inch of area of the portion of the surface of the ribbon to be bonded to the metal body, a coil of an electrically conductive metal carried by one of said members and constructed and arranged to lie closely adjacent to and extend along the portion of the sheet metal body to which the ribbon is to be bonded when said members are closed and be spaced from the sheet metal body a distance in the range of about 0.03 to 0.40 of an inch, a power supply means constructed and arranged to apply to said coil an alternating current having a frequency of at least about 5,000 Hz and a power of about 1,500 to 4,000 watts per square inch of area of the portion of the surface of the ribbon to be bonded to the sheet metal body, timing means applying such current to said coil for a period of time of not more than ten seconds to heat by induction to a temperature of about 200° F. to 400° F. substantially only the portion of the sheet metal body immediately adjacent the portion of the ribbon to be bonded to the sheet metal body and of insufficient time and power to heat the bulk of the ribbon sufficiently to activate the blowing agent in the bulk of the ribbon, whereby the ribbon is bonded to the sheet metal body without activating the blowing agent in the bulk of the ribbon.

* * * * *